United States Patent
Barbu et al.

(10) Patent No.: US 12,468,010 B2
(45) Date of Patent: Nov. 11, 2025

(54) MULTIPATH ESTIMATION AND MULTI-LINE-OF-SIGHT DETECTION FOR LOCALIZATION

(71) Applicant: Nokia Technologies Oy, Espoo (FI)

(72) Inventors: Oana-Elena Barbu, Aalborg (DK); Benny Vejlgaard, Gistrup (DK)

(73) Assignee: Nokia Technologie Oy, Espoo (FI)

( * ) Notice: Subject to any disclaimer, the term of this patent is extended or adjusted under 35 U.S.C. 154(b) by 473 days.

(21) Appl. No.: 17/973,035

(22) Filed: Oct. 25, 2022

(65) Prior Publication Data

US 2023/0137760 A1    May 4, 2023

(30) Foreign Application Priority Data

Oct. 28, 2021 (EP) ...................................... 21205303

(51) Int. Cl.
*G01S 5/10* (2006.01)
*H04W 64/00* (2009.01)

(52) U.S. Cl.
CPC .............. *G01S 5/10* (2013.01); *H04W 64/003* (2013.01)

(58) Field of Classification Search
CPC ...... G01S 5/10; G01S 5/0218; H04W 64/003; H04W 4/023; H04L 25/0214; H04L 27/2601; H04B 17/309
See application file for complete search history.

(56) References Cited

U.S. PATENT DOCUMENTS

| | | | |
|---|---|---|---|
| 2004/0266434 A1* | 12/2004 | Lehtinen | H04W 36/00837 455/450 |
| 2005/0278609 A1* | 12/2005 | Kim | H04L 25/067 714/780 |
| 2015/0188678 A1 | 7/2015 | Wu et al. | |
| 2016/0156424 A1* | 6/2016 | Mirbagheri | H04J 11/004 375/227 |
| 2016/0285571 A1* | 9/2016 | Badiu | H04L 25/0224 |
| 2019/0089405 A1 | 3/2019 | Ryden et al. | |

FOREIGN PATENT DOCUMENTS

WO    WO 2021/160434 A1    8/2021

OTHER PUBLICATIONS

Del Peral-Rosado, Jose A., "Position Accuracy of Joint Time-Delay and Channel Estimators in LTE Networks," IEEE Access vol. 6, Apr. 17, 2018.

* cited by examiner

*Primary Examiner* — Kabir A Timory
(74) *Attorney, Agent, or Firm* — McCarter & English, LLP

(57) ABSTRACT

There are provided apparatuses, methods and computer program products. In accordance with an embodiment, there is disclosed a method including receiving positioning reference signals from a positioning signal transmitter; forming a delay search space from the received positioning reference signals to obtain a plurality of channel taps; estimating a noise precision for the channel taps; estimating channel gains for the channel taps; and estimating a probability of line of sight signal for the channel taps.

14 Claims, 7 Drawing Sheets

MULTIPATH ESTIMATION AND MULTI-LINE-OF-SIGHT DETECTION FOR LOCALIZATION

TECHNICAL FIELD

The present invention relates to a method and apparatus for multipath estimation and multi-line-of-sight detection for localization.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. 5G supports 5G NR positioning, specifically network-based positioning, where the calculation of the location estimate of a mobile communication device, which may also be called as a user equipment (UE), is carried out at the network, at a location management function (LMF).

A special aspect of positioning in multipath propagation environments is that multiple signal paths can be used in estimating UE's location. However, the use of multiple paths is not trivial, since they are associated with reflections generated by landmarks with unknown locations. If the locations of such landmarks are obtained then the network may be able to successfully employ multipath measurement reports in refining the UE position beyond what the standard time-of-arrival/angle-of-arrival (TOA/AOA) methods can produce.

For localization purposes, a user equipment measures non-exclusively a metric called time-of-arrival (TOA). TOA is the shortest time a signal takes to travel the distance between a transmitter and a receiver. If TOA is measured correctly, then the distance can be accurately obtained as d=TOA×c, where c=speed of light in vacuum. To compute TOA, many user equipment estimate a power-delay profile (PDP) of the wireless propagation channel and select as the TOA the delay at which the PDP shows a peak as depicted in FIG. 7a. A problem with this approach is however that the strongest component does not always correspond to the line-of-sight LOS path (i.e. the direct path), as depicted in the example of FIG. 7b in which the tree attenuates the direct line-of-sight signal so that the signal reflected by the surrounding building is stronger at the location of the receiving user equipment. The user equipment observing this situation may select the time or arrival as the delay of the non-line-of-sight (NLOS) component since its power is the highest in this example. This selection will bias the overall location estimate since this component does not reflect the shortest distance between the gNB and the UE.

Furthermore, the radio environment is very dynamic, especially in cm wave and mm wave frequency bands, and any movement of the UE and/or radio obstacles in the environment can cause transitions from LOS to NLOS conditions. In practice, therefore the UE will rarely experience a pure LOS or pure NLOS propagation conditions and determining which of these conditions is dominant, and for how long, in the received signals can become a computationally intensive task.

One approach is to perform cross-correlation between the received and transmitted signal and search for the first energy peak of the resulting signal's envelope. Such detection approaches are limited however in resolution by the signal bandwidth and noise levels. In addition, the first tap may not have the strongest energy and can be smudged into other taps depending on channel/system conditions. Other solution categories for LOS detection use either hypothesis testing or machine learning methodology by evaluating channel metrics such as: mean excess delay, RMS delay spread, amplitude kurtosis, total received power, rise time, TOA of the first multipath component, maximum signal amplitude. These features are extracted after estimating channel impulse response and require extensive domain knowledge for a meaningful selection.

Extracting a set of input features from a noisy channel impulse response (CIR) estimate, obtained from band-limited measurements may be suboptimal since the selected features are inherently noisy and thus they exhibit misleading dependencies and limit the input set to only tens of observations and cannot ensure that the channel characteristics are fully captured.

Therefore, there is a need for a mechanism to improve the reliability and accuracy of location applications.

SUMMARY

Some embodiments provide a method and apparatus for localization.

Some embodiments provide a positioning-related method of multipath reconstruction and multi-LOS detection that is based on applying tools from the mean-field theory (MFT). The method poses the channel reconstruction problem as that of estimating the approximate probability density functions (pdf) for each of the variables in the set (delay, phase, amplitude, LOS-indicator) characterizing each reconstructed multipath component, using downlink positioning reference signals.

To enable the method, several choices have been made to pose an estimation model in which a channel is approximated as a sum of components lying on a fine delay grid, where each channel tap is assigned a LOS probability. The delay grid has flexible resolution, i.e., not limited to the sampling time of the system and allows for a flexible implementation, trading complexity for performance. The sampling time may be, for example, a basic time unit for NR (Tc); or a basic time unit for LTE (Ts).

In accordance with an embodiment of the disclosure, each tap is characterized by a line-of-sight probability, a complex gain and a delay, each modeled as a random variable characterized by a selected prior probability density function. The taps are considered to be independent and identically distributed (i.i.d.). The noise precision and/or noise variance pdf is also estimated, assuming an improper noise prior.

A method has also been derived that applies tools from mean-field theory (MFT) onto the above described model to estimate 1) a channel impulse response and subsequently to return the delay and phase of the most likely LOS component, but also those of other relevant components; 2) the LOS probability of each detected channel component; and 3) a level of a signal-to-noise ratio (SNR). However, also other than the mean-field theory may be used.

In accordance with an embodiment of the disclosure the method models and estimates a LOS probability/indicator per detected component, applies mean field theory tools to jointly estimate multiple LOS indicators, noise levels and detect multipath components from which the delay and phase can be subsequently extracted. Furthermore, the method enables LOS TOA selection based on the outcome of the estimation problem.

According to a first aspect there is provided an apparatus comprising:
  means for receiving positioning reference signals from a positioning signal transmitter;
  means for forming a delay search space from the received positioning reference signals to obtain a plurality of channel taps representing an estimation model of the channel;
  means for estimating a noise precision for the channel taps of a noise process corrupting the signals;
  means for estimating channel gains for the channel taps; and
  means for estimating a probability of line of sight signal for each channel tap.

According to a second aspect there is provided a method comprising:
  receiving positioning reference signals from a positioning signal transmitter;
  forming a delay search space from the received positioning reference signals to obtain a plurality of channel taps representing an estimation model of the channel;
  estimating a noise precision for the channel taps of a noise process corrupting the signals;
  estimating channel gains for the channel taps; and
  estimating a probability of line of sight signal for each channel tap.

According to a third aspect there is provided an apparatus comprising at least one processor; and at least one memory including computer program code the at least one memory and the computer program code configured to, with the at least one processor, cause the apparatus to perform at least the following:
  receive positioning reference signals from a positioning signal transmitter;
  form a delay search space from the received positioning reference signals to obtain a plurality of channel taps representing an estimation model of the channel;
  estimate a noise precision for the channel taps of a noise process corrupting the signals;
  estimate channel gains for the channel taps; and
  estimate a probability of line of sight signal for each channel tap.

According to a fourth aspect there is provided a computer program comprising computer readable program code which, when executed by at least one processor; cause the apparatus to perform at least the following:
  receive positioning reference signals from a positioning signal transmitter;
  form a delay search space from the received positioning reference signals to obtain a plurality of channel taps representing an estimation model of the channel;
  estimate a noise precision for the channel taps of a noise process corrupting the signals;
  estimate channel gains for the channel taps; and
  estimate a probability of line of sight signal for each channel tap.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
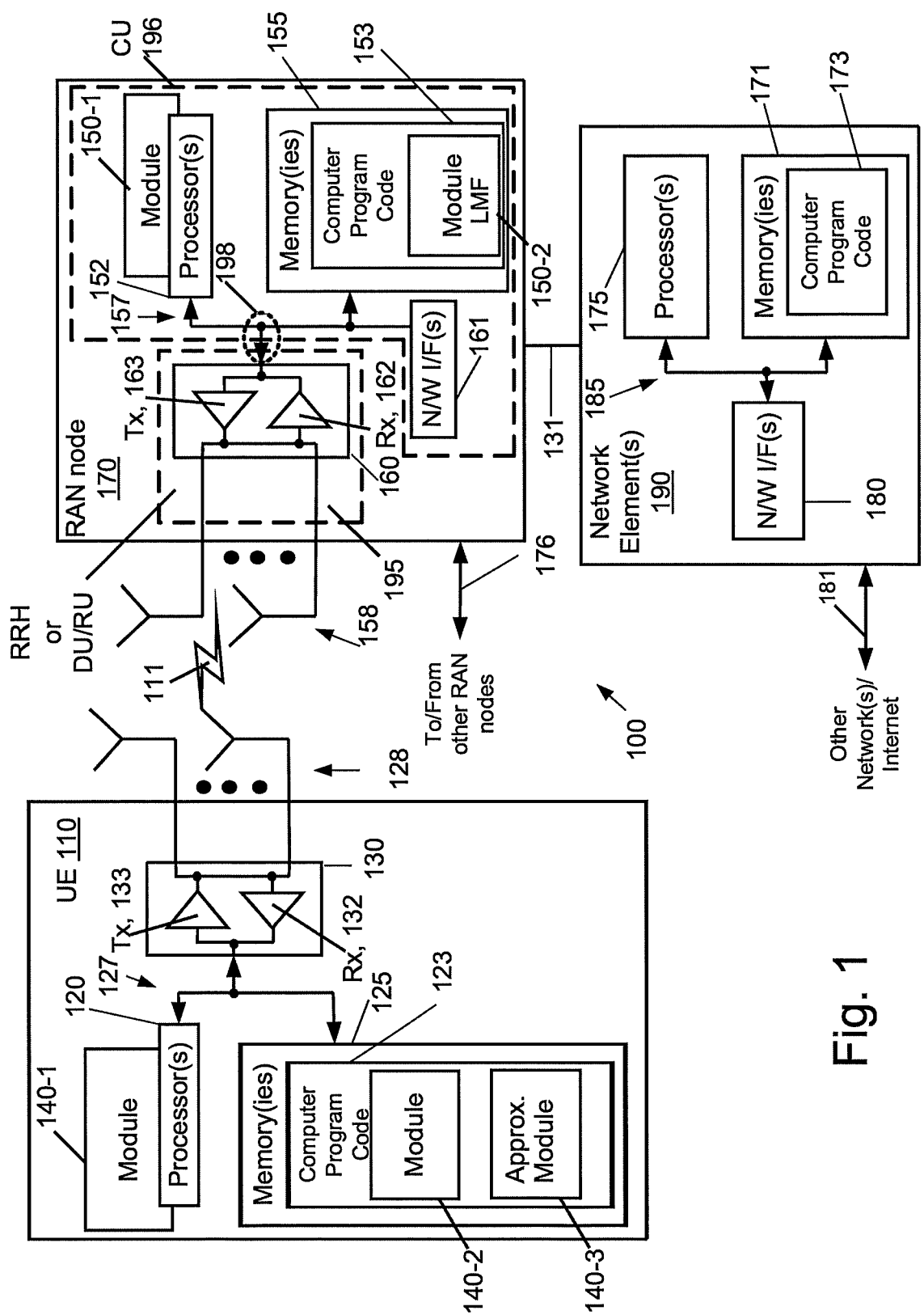
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

For example, the module 140-1 and/or 140-2 may comprise units (e.g. as a computer code) for performing different operations related to the reception and analyses of positioning signals as will be explained later.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element (s) 190, and other functions as described herein.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figure 2:
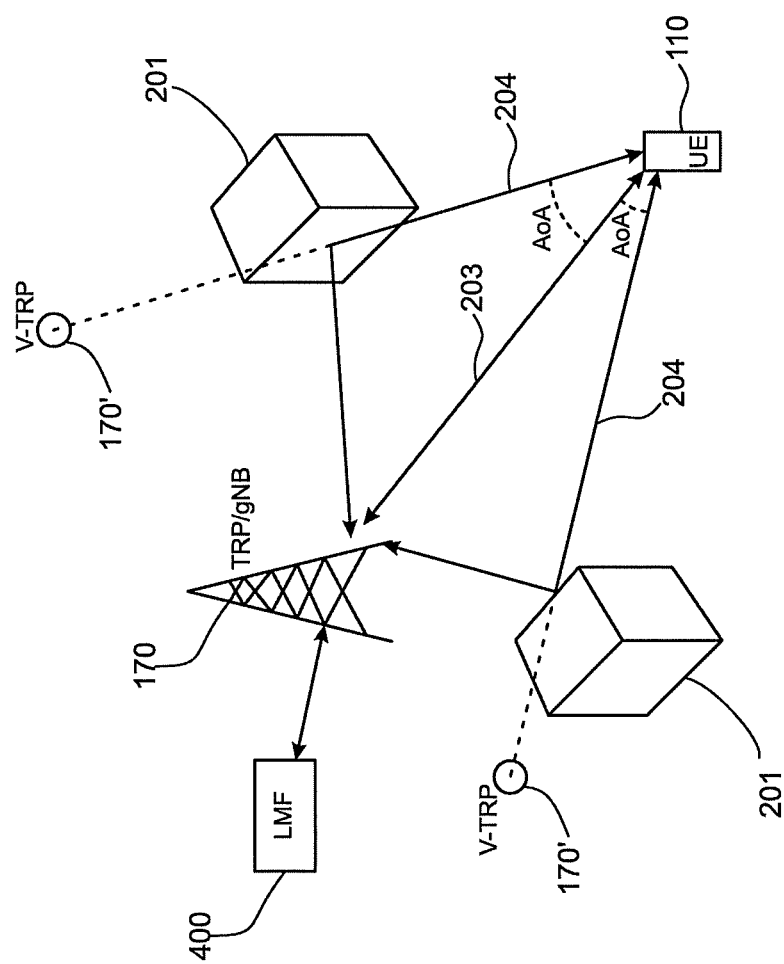
FIG. 2 illustrates an example situation in which a signal transmitted by a base station arrives at a receiving communication device as a direct line of sight signal and as signals reflected from obstacles.

FIG. 2 illustrates an example situation in which a signal transmitted by a base station 170 arrives at a receiving communication device 110 as a direct, line-of-sight (LoS) signal 203 and as signals 204 reflected from obstacles 201. In other words, the receiving communication device 110 receives the transmitted signal via multiple signal paths. In this example the signal is reflected from two buildings 201 and arrives at the receiving communication device 110 via the paths 204 illustrated in FIG. 2. In addition to reflecting signals an object may scatter a signal and also such a scattered signal may arrive at the receiving communication device 110. In this disclosure the reflected and scattered signals are also called as multipath propagated signals.

Because the reflected and scattered signals travel a longer path than the line-of-sight signal, they arrive later at the receiving communication device 110 than the line-of-sight signal but they represent the same information content. Each multipath propagated signal can be considered as a signal from a virtual transmission reception point (V-TRP) 170' and can be utilized in a UE positioning procedure. However, to do that the location of the object 201 reflecting and/or scattering the signal should be known by some accuracy in order to utilize it in the UE positioning procedure.

In the following, some embodiments are presented which mainly focus on the problem of effects of multi-path propagation to the calculation of the time-of-arrival.

Figure 4:
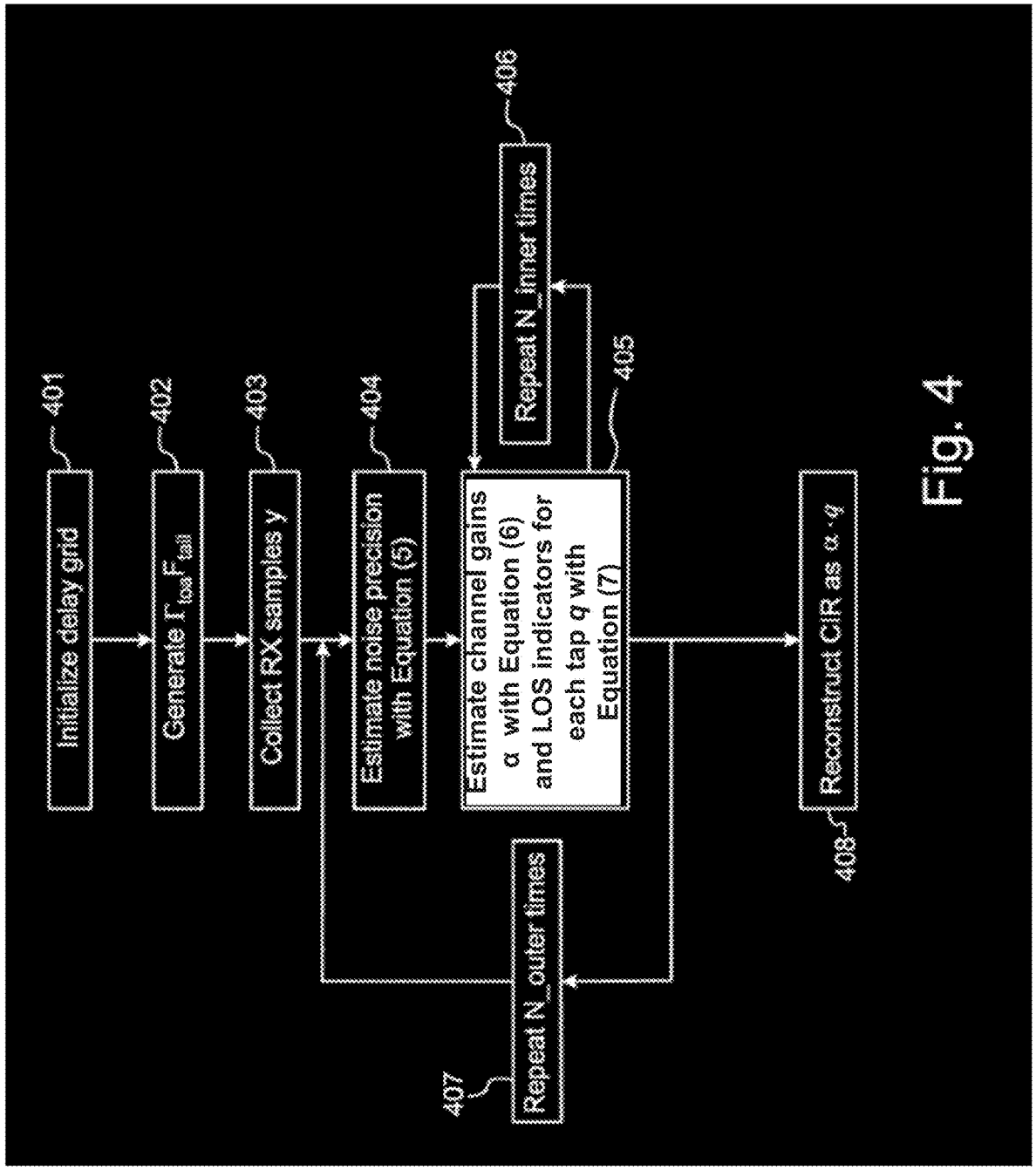
FIG. 4 shows as a flow diagram a method, in accordance with an embodiment of the disclosure.

The method in accordance with an embodiment of the disclosure is depicted in FIG. 4 and will be described in the following. It is assumed that the network comprises a location management function (LMF) 400, for example in a base station 170 or in some other network element and the user equipment 110 is used as the signal receiving entity, which obtains information related to the multipath propagated signals.

Figure 5:
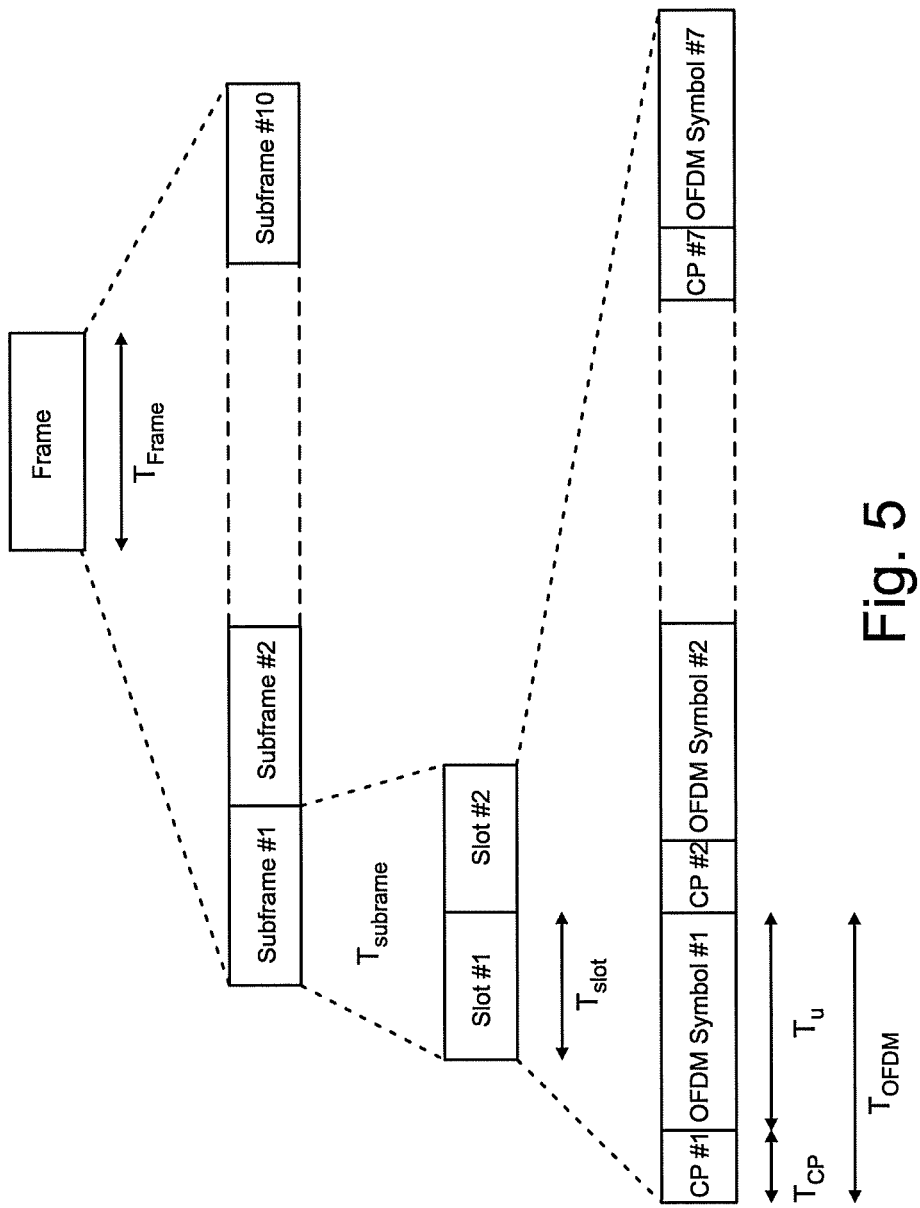
FIG. 5 illustrates a time-domain structure of a frame of an OFDM scheme in downlink direction according to an approach.

In 4G LTE and 5G NR the OFDM (Orthogonal Frequency Division Multiplexing) modulation scheme is used. FIG. 5 illustrates the time-domain structure of a frame (Type I) of the OFDM scheme in downlink direction according to an approach. The length of one frame is $T_{frame}$ and is divided to ten subframes of length $T_{subframe}$. Each subframe comprises two slots of length $T_{slot}$, comprising a cyclic prefix CP #1, CP #2, . . . , CP #7 and OFDM symbols #1, . . . , #7.

In the following a positioning signal transmission (PRS) and reception is described, assuming that the location management function 400 or/and another entity (a positioning signal transmission unit, a positioning transmitter) is capable of transmitting positioning signals and that the location of the entity is known. It should be noted that in practical positioning systems there are a plurality of positioning signal transmission units, but in the following only one such unit is considered. Furthermore, the user equipment 110 is assumed to be the receiving unit i.e. the device which receives the transmitted positioning signals.

To enable a method according to an example of the disclosure, several choices have been made to create an estimation model in which a channel is approximated based on received positioning signals as a sum of components lying on a fine delay grid, where each channel tap is assigned a LOS probability. The delay grid has flexible resolution, i.e., not limited to the sampling time of the system and allows for a flexible implementation, trading complexity for performance. The sampling time may be, for example, a basic time unit for NR (Tc); or a basic time unit for LTE (Ts).

It is assumed that the positioning transmitter 400 generates K reference symbols $u=[u_1, \ldots, u_K]^K$, which are OFDM modulated (Orthogonal Frequency Division Multiplex) with a cyclic prefix of $N_{cp}$ samples. These samples are sent over a channel, which can be assumed to have an impulse response $\alpha(t)=p\alpha_1\delta(t-\tau_1)+\Sigma_{l=2}^L \alpha_l \delta(t-\tau_l)$, where $(\alpha_l, \tau_l)$ are a complex gain and delay of an l-th tap. Without loss of generality, it can be assumed that $\alpha_1$ is the gain of the LOS component which arrives at a receiver placed r meters away from the transmitter, with a delay $$\tau_1 = \frac{r}{c}.$$

This delay can be called as a time of arrival (TOA). A variable q indicates LOS presence and is a Bernoulli distributed variable pr(p=1)=s, pr(p=0)=1−s. In other words, the Bernoulli distributed variable for the LOS can be expressed as pr(LOS present)=s, pr(LOS not present)=1−s.

In the following, an estimation problem is derived that is built using the following underlying modelling choices. A delay search space of variable (fine) resolution is derived by selecting a variable oversampling factor G and each channel tap lying on the above-mentioned delay grid is defined as a random variable composed of a complex gain part and a LOS indication part.

Prior probability density functions are selected for the postulated channel model defined above and the noise variance.

The receiver 132 of the user equipment 110 receives the OFDM modulated transmission and performs a corresponding OFDM demodulation. After the OFDM demodulation an approximation unit 140-3 of the user equipment 110 performs the following approximations $$\tau_l \approx \frac{lT_s}{G}, L \approx N_{cp}.$$

An approximate model of the received signal can be created so that the model consists of K samples $y=[y_1, \ldots, y_K]^T$:

$$y=\Gamma_{toa}F_{tail}\alpha+\xi \quad (3)$$

where $\xi$ is additive white Gaussian noise (AWGN) with variance $1/\lambda$, and G is the selected oversampling delay factor.

The matrix $\Gamma_{toa}=D^{(r)}O^{(d)}$ is the perceived TOA matrix modelling on a per-subcarrier basis the contributions of the TOA $\tau_1$ and the potential clock offset between the transmitter of the positioning signal transmitter and the receiver 132 of the user equipment $dT_s$, where $T_s$ is the sampling time of the system.

Matrices $D^{(r)}, O^{(d)} \in C^{K \times K}$ are each diagonal, with diagonal entries:

$$D^{(r)}(k,k) = \exp\left(-\frac{j2\pi kr}{KT_s c}\right) = \exp\left(-\frac{j2\pi k\tau_1}{KT_s}\right), O^{(d)}(k,k) = \exp\left(-\frac{j2\pi kd}{K}\right)$$

and model the TOA contribution and the offset contributions across subcarriers respectively.

The matrix $$F_{tail} \in C^{K \times S}, F(k,l) = \exp\left(-j\frac{2\pi kl}{K}\right) l = 0: S-1, S = (N_{cp}T_s - \tau_1)/G + 1$$

models the contributions of the remaining taps, i.e. a tail of the channel impulse response (CIR) vector.

The CIR vector is $\alpha=[q_1\alpha_1, q_2\alpha_2, \ldots, q_S\alpha_S]^T$ where a LOS probability may be assigned to each of the taps. Then, the LOS vector is $q=[q_1, \ldots, q_S]$ illustrating LOS probabilities of different taps.

When the clock offset $dT_s$ is unknown by the user equipment, the user equipment aims at estimating the perceived TOA, i.e. $t_p=(\tau_1+d)$, and reports the estimated, perceived TOA $t_p$ to the network, e.g. to the gNB or TRP node. Hence, the user equipment leaves the task of decoupling d and $\tau_1$ to the network side. In such a situation, the matrix $\Gamma_{toa}$ can be re-written as $$\Gamma_{toa}(k,k) = \exp\left(-\frac{j2\pi kd_p}{K}\right), d_p = \frac{\tau_p}{T_s} \in \mathbb{R}^+.$$

This re-written $\Gamma_{toa}$ can now be used on the equation (3) to estimate a probability of LOS expressed through vector q, a perceived discrete TOA $d_p$, and a gain of LOS tap $\alpha_1$.

To do that, the probability density functions of $\alpha$, q, $\lambda$ are estimated using the equation (3) for which the joint probability density function is proportional to:

$$p(\alpha,q,\lambda,s,y) \propto p(y|\alpha,q,\lambda,s)p(\lambda)p(\alpha)p(q|s)p(s) \quad (4)$$

It should be noted that by estimating all the channel gains â the corresponding delays can be obtained as $$\hat{\tau}_l = \frac{lT_s}{G} \text{ if } (|\hat{a}_l| > \epsilon),$$

where $\epsilon$ is a chosen error floor. In equation (4) the factors in the right-hand side product are:
  $p(y|\alpha,q)=CN(\Gamma_{toa}F_{tail}a, 1/\lambda I)$, CN( ) is the complex Gaussian distribution, $$P(\lambda) = \frac{1}{\lambda}$$

p(q)=Πp(q_l), p(q_l)=U(0,1), where U( ) is the uniform distribution, p(α)=CN(0, C), C is known covariance matrix, e.g. C=I.

To estimate the unknowns in the equation (4), the mean field theory methodology can be applied and approximate probability density functions of (α, q, λ) called beliefs are estimated and denoted by v( ). Then, the following expressions are obtained.

The noise precision estimate ($\hat{\lambda}$) reads:

$$\hat{\lambda} = \frac{K}{\|y - \Gamma_{toa}F_{tail}\hat{a}\|_2^2}, \quad a = [\hat{q}_1\hat{\alpha}_1, \ldots, \hat{q}_S\hat{\alpha}_S]^T \quad (5)$$

The l-th channel gains belief is $v(\alpha_l) = CN(\hat{\alpha}_l, V_l)$ with:

$$\hat{\alpha}_l = \frac{\left(\hat{\lambda}q_l\left(\Omega_l^H y - \sum_{k \neq l} J_{k,l}\hat{\alpha}_k\right)\right)}{V_l}, l = 1:S \quad (6)$$

$\Omega_l$ is the l-th column of a $\Omega = (\Gamma_{toa}F_{tail})$, $J_{k,l} = \Omega_l^H \Omega_k$, $V_l = C(l, l)^{-1} + \hat{\lambda}|f_l|^2 J_{l,l}$.

Lastly, the LOS indicator per tap is computed as $$\hat{q}_l = \arg\max_{q \in [0,1]} \left(-2\text{Re}\{\hat{\lambda}y^H \Omega A q_{-l}\} + q_{-l}\lambda A^H \Omega^H \Omega A q_{-l}\right), l = 1:S \quad (7)$$

where $q_{-l} = [\widehat{q_1} \ldots, q_l, \widehat{q_{l+1}}, \ldots, q_S]^T$ and $A = \text{diag}(\alpha)$.

Figure 3:
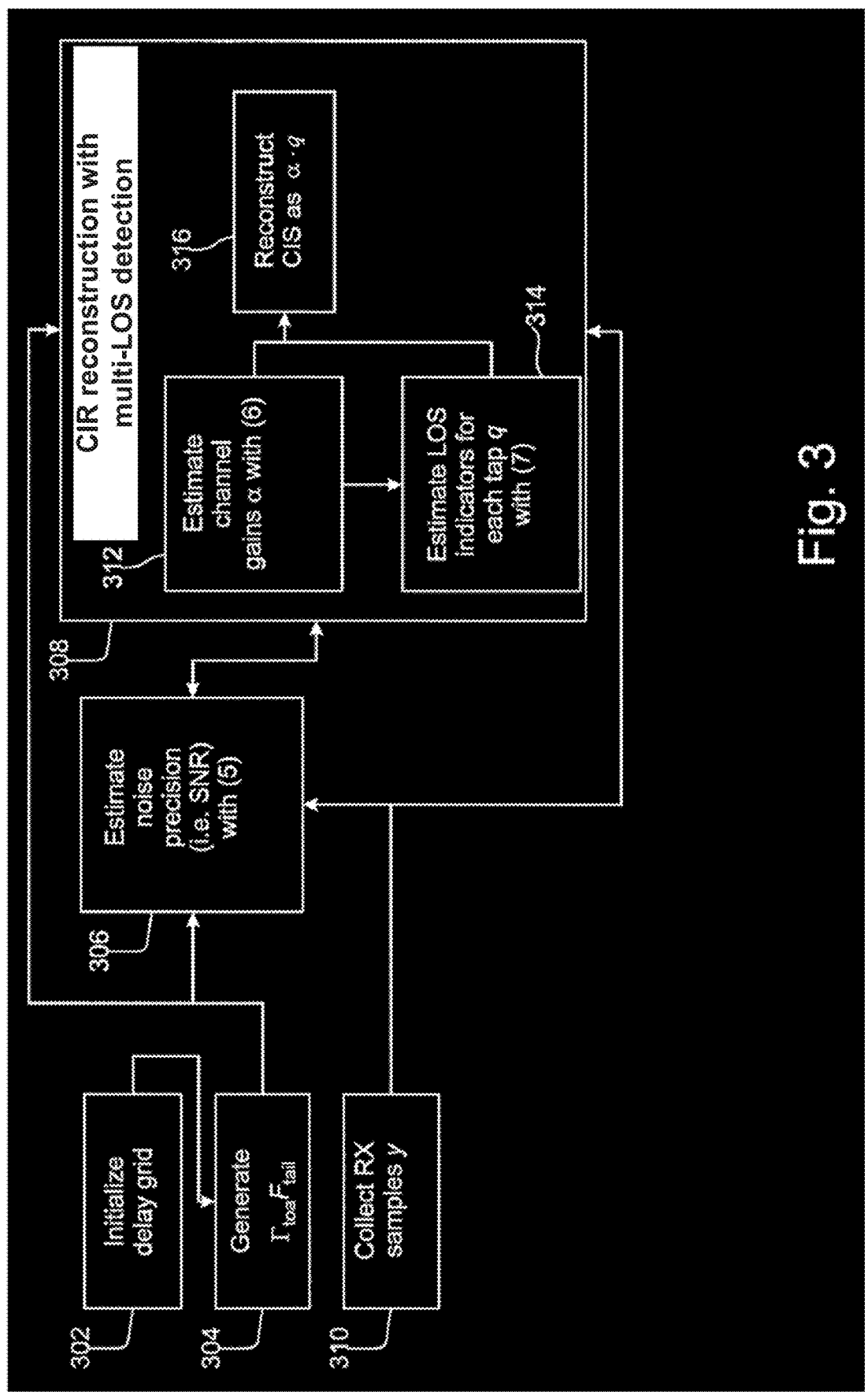
FIG. 3 illustrates an architecture implementation according to an example embodiment of the disclosure.

In the following an architecture implementation according to an example embodiment of the disclosure will be described in more detail with reference to FIG. 3. and a method applying the equations (3)-(7) with reference to FIG. 4. The sample collector 310 collects 403 samples obtained from the received signal by demodulation.

The method is initialized by defining 401 a delay grid by an initializes 302 with chosen resolution, e.g. 5 ns. The matrix $\Gamma_{toa}F_{tail}$ can then be generated 402 by a matrix generator 304 and input, together with the received samples, to a noise estimator 306 and a channel impulse response reconstructor 308.

In accordance with an embodiment of the disclosure, the method then continues with a noise update by the noise estimator 306, implementing the equation (5) to calculate 404 the noise precision estimate value $\hat{\lambda}$. The channel impulse response reconstructor 308 receives the noise precision estimate value and calculates 405 the channel gains beliefs $v(\alpha_l)$ for l channels and LOS indicators $\hat{q}_l$ per each tap by implementing an inner loop, ping-ponging between updates according to the equations (6) and (7) for a number of N_inner times 406. In other words, the channel impulse response reconstructor 308 estimates 312 channel gains with the equation (6) and LOS indicators 314 for each tap q with the equation (7). This is repeated N_inner times. One sequence of updates of the equation (5) and N_inner repetitions (updates) of {(6, (7))} can be called as a turbo loop in this description. The method can implement N_outer turbo loops 407. After the N_outer turbo loops (i.e. N_outer repetitions of the equation (5) and N_inner repetitions of {(6, (7))}), the CIR reconstructor 316 outputs 408 a channel impulse response (CIR) vector characterized by (delay, amplitude, phase), where the amplitude is the real-valued gain multiplied by the LOS indicator q.

In accordance with an embodiment, the updates of the equations (6) and (7) (the inner loop 406) and/or the turbo loop 407 may be performed sequentially and/or in parallel until a predetermined criteria is fulfilled. Such criteria may be, for example, that the output of one or both of the equations (i.e. an estimate of one or more of the random variables) has converged towards or to a value which does not change during further repetitions or the change is less than a threshold.

According to some embodiments of the disclosure some advantages may be obtained. For example, joint delay and LOS probability indication per tap may be obtained and flexibility may be achieved due to trading complexity for performance via the model selection, e.g. delay grid resolution, method convergence criteria. Increased accuracy positioning via multipath gain and LOS indication reporting may also follow from the implementation of the method.

Figure 6:
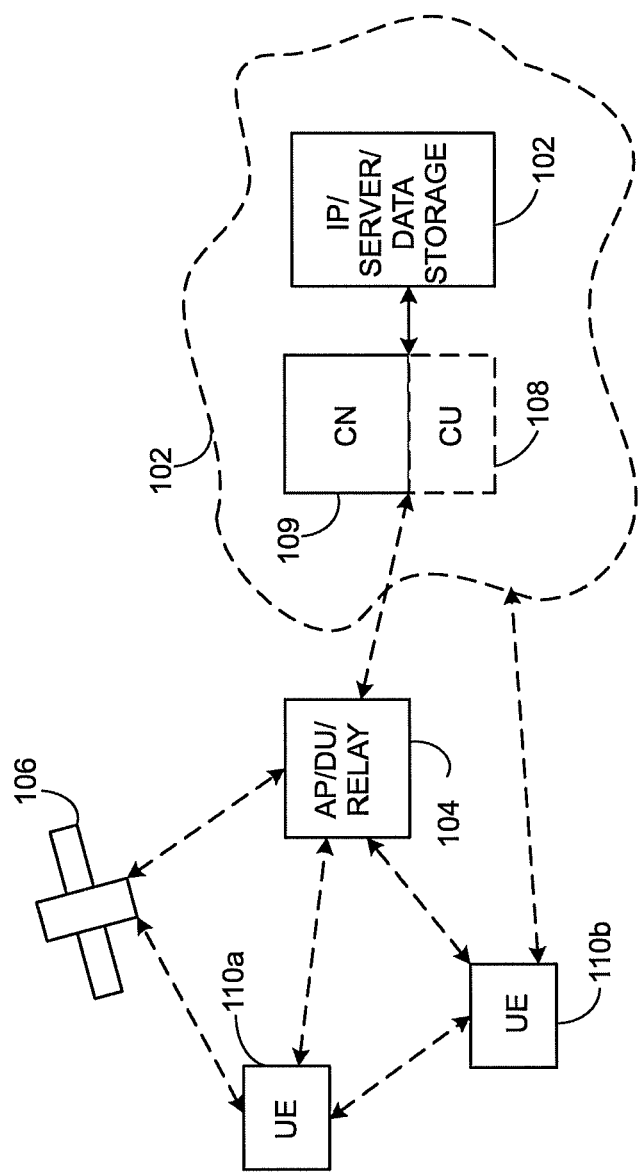
FIG. 6 shows a part of an exemplifying wireless communications access network in accordance with at least some embodiments.
Figure 7A:
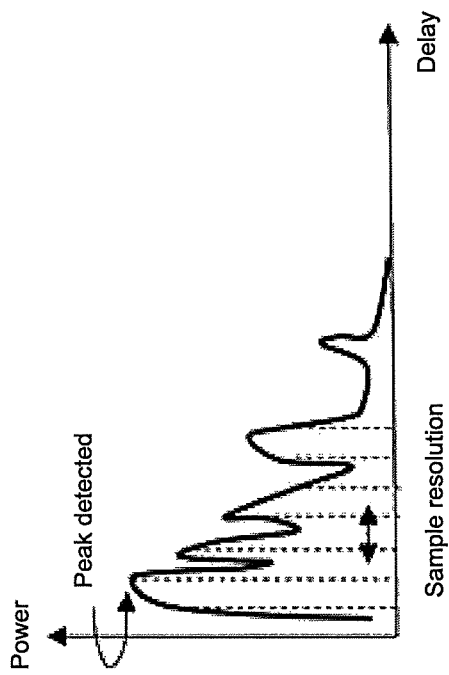
FIG. 7a shows an example of an estimated power-delay profile of a wireless propagation channel.
Figure 7B:
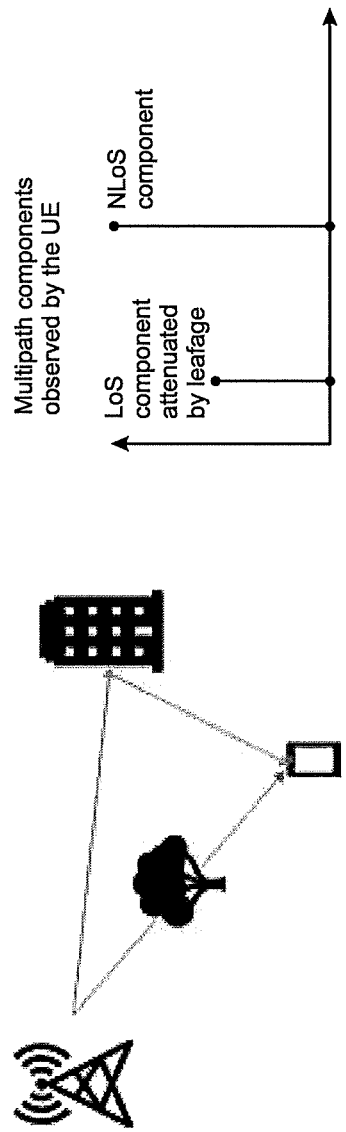
FIG. 7b shows an example in which a tree attenuates a direct line-of-sight signal so that the signal reflected by a surrounding building is stronger at a location of a receiving user equipment.

FIG. 6 depicts examples of simplified system architectures only showing some elements and functional entities, all being logical units, whose implementation may differ from what is shown. The connections shown in FIG. 6 are logical connections; the actual physical connections may be different. It is apparent to a person skilled in the art that the system typically comprises also other functions and structures than those shown in FIG. 6.

The embodiments are not, however, restricted to the system given as an example but a person skilled in the art may apply the solution to other communication systems provided with necessary properties.

The example of FIG. 6 shows a part of an exemplifying radio access network.

FIG. 6 shows user equipments 110a and 110b configured to be in a wireless connection on one or more communication channels in a cell with an access node (such as (e/g) NodeB) 104 providing the cell. The physical link from a user equipment to a (e/g)NodeB is called uplink (UL) or reverse link and the physical link from the (e/g)NodeB to the user equipment is called downlink (DL) or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to as management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 6) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 6 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 6 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 6). A HNB Gateway (HNB-GW), which is typically installed within an operator's network may aggregate traffic from a large number of HNBs back to a core network.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In the following, a list of acronyms used in this specification are provided:

3GPP—3$^{rd}$ Generation Partnership Project
4G-LTE—Long Term Evolution
5G—5th Generation
AOA Angle of Arrival
AOD Angle of Departure
BS Base station
BW Bandwidth
CFR—Channel Frequency Response
CU—Central Unit
DL—Downlink
DSP—Digital Signal Processor
DU—Distributed Unit
eNB—evolved NodeB
FPGA—Field-programmable gate array
gNB—evolved NodeB
GEO—Geostationary Earth Orbit
HNB-GW—Home Node B Gateway
IoT—Internet of Things
LEO—Low Earth Orbit
LMC—Location Management Component
LMF—Location Management Function
LOS—Line of Sight
LOS—Long Time Evolution
M2M—Machine-to-Machine
MFT—Mean Field Theory
MIMO—Multiple Input-Multiple Output
MME—Mobility Management Entity
mMTC—(massive) Machine-type Communications
MSE—Mean Square Error
NGC—Next Generation Core
NLOS—Non-Line of Sight
NR—New Radio
OFDM—Orthogonal Frequency Division Multiplexing
pdf—Probability Density Function
PDP—Power Delay Profile
PRS Positioning Reference Signals
RAN—Radio Access Network
RAT—Radio Access Technology
RRC—Radio Resource Control
RRH—Remote Radio Head
RU—Radio Unit
SGW—Serving Gateway
SIM—Subscriber Identification Module
SMF—Session Management Function
SNR—Signal to Noise Ratio
TDOA—Time Difference of Arrival
TOA—Time of Arrival
TRP—Transmission Reception Point
UE—User Equipment
UL—Uplink
UPF—User Plane Function
V-TRP Virtual Transmission/Reception Point The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
   at least one processor; and
   at least one non-transitory memory storing instructions that, when executed with the at least one processor, cause the apparatus to perform:
   receiving positioning reference signals from a positioning signal transmitter from a single base station;
   forming a delay search space from the received positioning reference signals to obtain a plurality of channel taps representing an estimation model of a channel between the apparatus and the single base station;
   estimating a noise precision for the plurality of channel taps of a noise process corrupting the received positioning reference signals from the single base station;
   estimating channel gains for individual ones of the plurality of channel taps;
   estimating a probability of a line of sight signal for each of the plurality of channel taps;
   using the estimated probability of the line of sight signal for each channel tap to determine the line of sight signal for each channel tap; and
   using the line of sight signal for each of the plurality of channel taps at least in a positioning procedure performed by the apparatus.

2. The apparatus according to claim 1, said instructions, when executed with the at least one processor, cause the apparatus to select a variable resolution and length of the delay search space.

3. The apparatus according to claim 1, wherein each channel tap lying on the delay search space is defined as a random variable composed of a complex gain part and a line of sight identifier part.

4. The apparatus according to claim 1, wherein the instructions, when executed with the at least one processor, cause the apparatus to perform estimations of noise precision, channel gains and probability of line of sight signal parallel or in series until a predetermined condition has been achieved.

5. The apparatus according to claim 4, wherein said predetermined condition is that one or more of the estimations has converged towards or to a value which does not change during further repetitions or the change is less than a threshold.

6. The apparatus according to claim 1 where the instructions, when executed with the at least one processor, cause the apparatus to map samples of the received positioning reference signals to the estimation model of the channel comprising a tail of a channel impulse response vector.

7. The apparatus according to claim 1 where the instructions, when executed with the at least one processor, cause the apparatus to:
   detect multipath components based on the estimation model; and
   determine a delay and phase of the detected multipath components.

8. The apparatus according to claim 1 where the instructions, when executed with the at least one processor, cause the apparatus to perform estimating delays of the plurality of channel taps based on the estimated channel gains.

9. A method comprising:

Receiving, at a user equipment, positioning reference signals from a positioning signal transmitter from a single base station;

forming a delay search space from the received positioning reference signals to obtain a plurality of channel taps representing an estimation model of a channel between the user equipment and the single base station;

estimating a noise precision for the plurality of channel taps of a noise process corrupting the received positioning reference signals from the single base station;

estimating channel gains for the plurality of channel taps;

estimating a probability of a line of sight signal for each of the plurality of channel taps;

using the estimated plurality of the line of sight signal for each channel tap to determine the line of sight signal for each channel tap; and using the line of sight signal for each channel tap at least in a positioning procedure performed by the user equipment.

10. The method according to claim 9 comprising:

selecting a variable resolution and length of the delay search space.

11. The method according to claim 9 comprising:

defining each channel tap lying on the delay search space as a random variable composed of a complex gain part and a line of sight identifier part.

12. The method according to claim 9 comprising:

performing estimations of noise precision, channel gains and probability of line of sight signal parallel or in series until a predetermined condition has been achieved.

13. The method according to claim 12, wherein said predetermined condition is that one or more of the estimations has converged towards or to a value which does not change during further repetitions or the change is less than a threshold.

14. A non-transitory computer readable medium comprising program instructions stored thereon for performing at least the following:

receiving, at a user equipment, positioning reference signals from a positioning signal transmitter from a single base station;

forming a delay search space from the received positioning reference signals to obtain a plurality of channel taps representing an estimation model of a channel between the user equipment and the single base station;

estimating a noise precision for the plurality of channel taps of a noise process corrupting the received positioning reference signals;

estimating channel gains for the plurality of channel taps;

estimating a probability of a line of sight signal for each of the plurality of channel taps;

estimating a probability of a line of sight signal for each channel tap;

using the estimated probability of the line of sight signal for each channel tap to determine line of sight signal for each channel tap; and using the line of sight signal for each channel tap at least in a positioning procedure performed by the user equipment.

* * * * *